United States Patent [19]
Senuma et al.

[11] Patent Number: 5,498,867
[45] Date of Patent: Mar. 12, 1996

[54] WAVELENGTH-DIVISION MULTIPLEX DIGITAL OPTICAL POSITION SENSOR

[75] Inventors: Takeo Senuma, Akishima; Shinichiro Ina, Hadano; Hiroshi Nakazawa, Hachioji; Yasuaki Tamura, Tokyo; Kunihiko Mano, Tokyo; Fumio Nakamura, Tokyo; Munenori Ishikawa, Gifu; Yoshiharu Kubo, Kakamigahara, all of Japan

[73] Assignees: Sachio Uehara, Tokyo; Kawasaki Jukogyo Kabushiki Kaisha, Kobe; Oki Electric Industry Co., Ltd., Tokyo, all of Japan

[21] Appl. No.: 345,413

[22] Filed: Nov. 21, 1994

[30] Foreign Application Priority Data

Nov. 22, 1993 [JP] Japan ................................ 5-291579
Nov. 22, 1993 [JP] Japan ................................ 5-291580

[51] Int. Cl.$^6$ ............................................. G01D 5/34
[52] U.S. Cl. .......................... 250/231.18; 250/227.23; 250/226; 359/115; 356/395
[58] Field of Search ................... 250/231.13, 231.18, 250/227.21, 227.23, 226, 237 G; 341/13, 31; 359/115, 124, 127; 356/373, 375, 395

[56] References Cited

U.S. PATENT DOCUMENTS

| | | | |
|---|---|---|---|
| 4,842,357 | 6/1989 | Doneen | 359/117 |
| 4,849,624 | 7/1989 | Huggins | 250/226 |
| 4,964,727 | 10/1990 | Huggins | 356/373 |
| 5,237,391 | 8/1993 | Huggins | 250/237 G |
| 5,281,811 | 1/1994 | Lewis | 250/227.23 |
| 5,424,535 | 6/1995 | Albion et al. | 250/231.13 |

OTHER PUBLICATIONS

Optics Letters, vol. 11, No. 1, Jan. 1, 1986, "Wavelength–Division Multiplexed Digital Optical Position Transducer," Fritsch et al.

Fiber Optic Systems For Mobile Platforms II, SPIE vol. 989, pp. 29–37, (1988), "Wavelength Division Multiplexed Fiber Optic Sensors For Aircraft Applications", Lewis et al.

*Primary Examiner*—Stephone B. Allen
*Attorney, Agent, or Firm*—Spencer & Frank

[57] ABSTRACT

According to a first aspect of the invention, an optical position sensor employs a position encoder having collimators and reflectors with mutually aligned optical axes mounted in a support. A slotted code plate moves between the collimators and reflectors in a plane non-perpendicular to their optic axes. This encoder converts position to optical signals reliably, regardless of mechanical shock or vibration. According to a second aspect of the invention, an optical position sensing system employs wavelength-division multiplexing to distribute light pulses to different position encoders and time-division multiplexing to further distribute pluses to the collimators in each encoder. This permits multiple position encoders to be served by a single light source and optical fiber.

22 Claims, 10 Drawing Sheets

5,498,867

WAVELENGTH-DIVISION MULTIPLEX DIGITAL OPTICAL POSITION SENSOR

BACKGROUND OF THE INVENTION

This invention relates to a digital optical position sensor system for sensing the position of one or more objects in an electrically noisy environment such as a factory or aircraft, more particularly to a sensor that employs wavelength-division multiplexing for optical transport of signals.

Optical signal transport is advantageous because it confers immunity from electromagnetic interference. A conventional digital optical position sensor employs an optical position encoder in which position is indicated by black and white markings in a set of parallel or concentric tracks on a movable code plate or disk. Each track is scanned by an optical element such as a collimator. The collimator receives light from an optical fiber, directs the light onto the track, and returns the reflected light (if any) to the fiber. The fiber terminates at an optical coupler connected to a light source, which sends light pulses into the fiber, and to a photosensor, which converts the returning light to an electrical signal.

One problem with this conventional sensor system is that a separate fiber, coupler, and light source are required for each track. A twelve-bit sensor, for example, requires twelve fibers, couplers, and light sources. Since a factory or aircraft subsystem may include many different sensors, and since aircraft subsystems in particular must be made redundant for reliability, the quantity of fibers, couplers, and light sources can become quite large, e.g. 360 of each item for a triply redundant system with ten twelve-bit sensors (3×10×12=360). This is a disadvantage from the standpoint of space and weight as well as for economic reasons.

Another problem found in conventional sensors is that, due to vibration for example, the code plate or disk will not always be aligned at right angles to the optic axes of the collimators. As a result, light reflected from a given track may miss the corresponding collimator.

One solution often adopted to this last problem employs a code plate with a pattern of windows that transmit light and opaque portions that absorb or reflect light. The collimators are located on one side of the code plate, and the photosensors on the other side. This enables the optical signals to be picked up reliably, but has the disadvantage that the photosensors generate electrical signals, which must then be transmitted over conventional wiring instead of through optical fibers, with attendant risk of electromagnetic interference.

SUMMARY OF THE INVENTION

It is accordingly an object of the present invention to reduce the number of optical fibers, couplers, and light sources required in an optical position sensor system.

Another object of the invention is to sense position reliably despite the presence of mechanical vibration or other unwanted motion.

The invented optical position sensing system comprises a back end and a front end interconnected by an optical fiber. The back end generates a broadband light pulse, which it transmits through the optical fiber to the front end. The front end has a wavelength multiplexer-demultiplexer that demultiplexes the broadband light pulse to a plurality of narrowband light pulses of different wavelengths.

According to a first aspect of the invention, these narrowband light pulses are distributed to the collimators of an optical position encoder. The collimators are mounted in a support and are aligned with reflectors mounted in the same support. A slotted code plate moves between the collimators and reflectors, in a plane that is non-perpendicular to their optic axes, so that reflected light is returned to a collimator only when the collimator and its reflector are aligned with a slot in the code plate. The wavelength multiplexer-demultiplexer combines all such reflected light into a returning broadband light pulse, which is transmitted via the optical fiber to the back end.

According to a second aspect of the invention, the narrowband light pulses are distributed, one each, to a plurality of optical position encoders. Each narrowband light pulse is transmitted through a plurality of optical delay lines having different propagation delay times, thereby creating a plurality of delayed narrowband light pulses, and these are distributed to the collimators of the corresponding optical position encoder. Reflected light received by the different collimators in each optical position encoder is recombined to form one narrowband pulse train per optical position encoder. The wavelength multiplexer-demultiplexer multiplexes these narrowband pulse trains into a single returning broadband pulse train, which is transmitted via the optical fiber to the back end.

In both the first and second aspects of the invention, the back end has a wavelength demultiplexer that demultiplexes the returning broadband light pulse or pulse train into a plurality of returning narrowband light pulses or pulse trains of different wavelengths, and a plurality of photosensors that convert these pulses or pulse trains to electrical signals.

DETAILED DESCRIPTION OF THE PREFERRED EMBODIMENTS

Embodiments exemplifying the invention will now be described with reference to the attached illustrative drawings.

Figure 1:
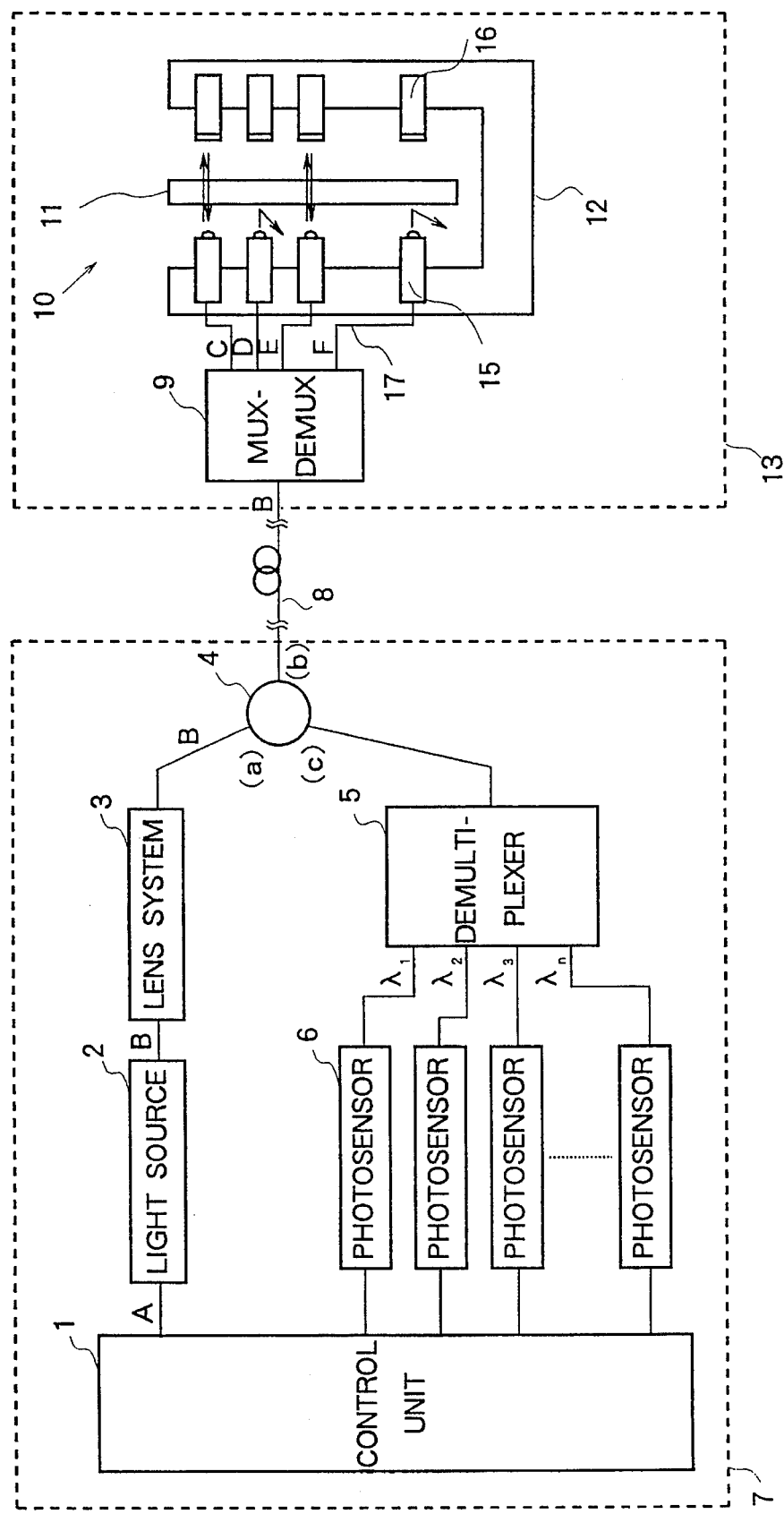
FIG. 1 is a block diagram of a first embodiment of the invention.

FIG. 1 is a block diagram illustrating a first embodiment of the invention, showing a system with an n-bit encoder for sensing the position of a single object.

The system has a control unit 1, a broadband light source 2, a lens system 3, an optical coupler 4, a wavelength demultiplexer 5, and a plurality of photosensors 6. These elements constitute a back end 7, which is coupled to one end of an optical fiber 8. At the other end of the optical fiber 8 are a wavelength multiplexer-demultiplexer 9 and a novel optical position encoder 10 comprising a movable code plate 11 and support 12. The wavelength multiplexer-demultiplexer 9 and optical position encoder 10 constitute the front end 13 of the system. Mounted in the support 12 are a plurality of collimators 15 and a like plurality of reflectors 16. The collimators 15 are coupled to the wavelength multiplexer-demultiplexer 9 by optical fibers 17. The purpose of the system is to sense the position of the code plate 11, which would normally be attached to some object of interest, such as a mechanical actuator.

The broadband light source 2 is adapted to receive electrical pulses A from the control unit 1 and convert them to optical pulses B with a broad wavelength spectrum. The broadband light source 2 may be, for example, an erbium-doped fiber amplifier (EDFA) operating at a center wavelength of 1.55 μm with a spectral bandwidth of 35 nm, and providing an optical output level of 6 to 8 dBm. Alternatively, a semiconductor optical amplifier such as a laser diode can be employed, providing from −5 to 0 dBm of optical power. Known laser diodes can emit light with, for example, a center wavelength of 1.3 μm and spectral bandwidth of 60 nm, or a center wavelength of 1.5 μm and spectral bandwidth of 80 nm.

The lens system 3 comprises one or more lenses or other optical elements that optically couple the light pulses output by the broadband light source 2 to a first port (a) of the optical coupler 4. The optical coupler 4 is a well-known device with three ports (a, b, and c). Light entering at the first port (a) is transmitted to and output from the second port (b). Light entering at the second port (b) is transmitted to and output from the third port (c), but not from the first port (a). The second port (b) is coupled to the optical fiber 8, while the third port (c) is coupled to the wavelength demultiplexer 5.

The wavelength demultiplexer 5 receives light with a broadband spectrum from the third port (c) of the optical coupler 4, and demultiplexes the light to a plurality of narrowband light signals with center wavelengths $\lambda_1, \lambda_2, \lambda_3, \ldots, \lambda_n$. These are received by respective photosensors 6 and converted to electrical signals for input to the control unit 1. The photosensors 6 are, for example, well-known photodiode devices. The internal structure of the wavelength demultiplexer 5 may be identical to the internal structure of the wavelength multiplexer-demultiplexer 9, which will be described next.

The wavelength multiplexer-demultiplexer 9 demultiplexes broadband light B received from the optical fiber 8 to narrowband light signals C, D, E ..., F for output via the optical fibers 17 to the collimators 15, and multiplexes returning narrowband light signals (which will again be denoted C, D, E ..., F) from the collimators 15 to a broadband light signal for output to the optical fiber 8.

Figure 2:
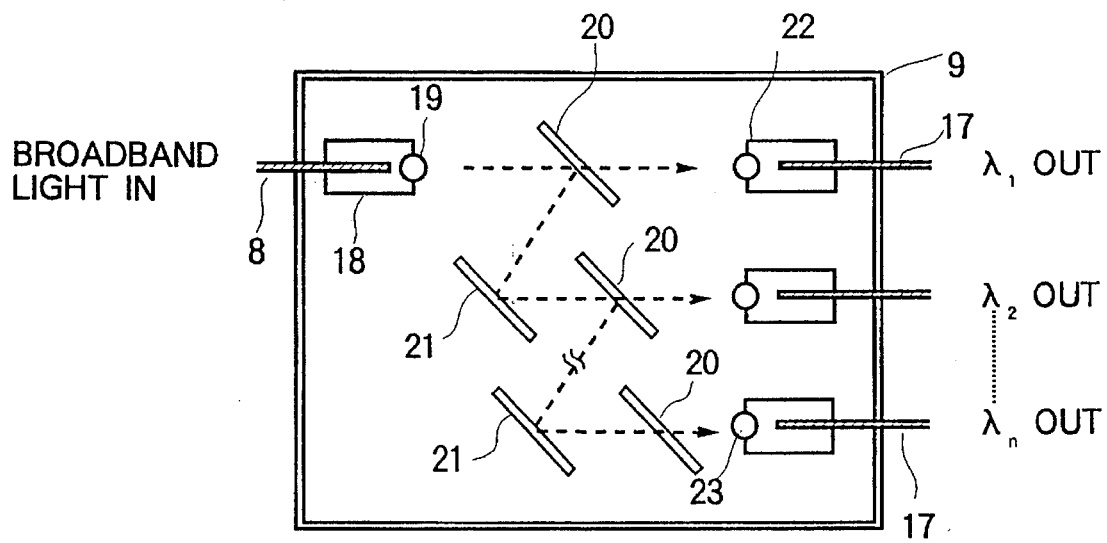
FIG. 2 shows the structure of one version of the wavelength multiplexer-demultiplexer in FIG. 1.

Referring to FIG. 2, the wavelength multiplexer-demultiplexer 9 has a broadband port 18 with a spherical collimating lens 19, which is optically coupled to the optical fiber 8, and a plurality of interference filters 20 mounted at slightly differing angles so as to transmit light of the different wavelengths $\lambda_1, \lambda_2, \ldots, \lambda_n$. A plurality of reflectors 21 are disposed so that light not transmitted by each interference filter 20 is reflected to the next interference filter 20. The lens 19 directs light from the broadband port 18 to the first interference filter 20. A broadband light signal input at the broadband port 18 is thereby separated into narrowband light signals with wavelengths $\lambda_1, \lambda_2, \ldots, \lambda_n$. These are output at a plurality of narrowband ports 22, each having a spherical collimating lens 23, which couple the light of wavelengths $\lambda_1, \lambda_2, \ldots, \lambda_n$ to respective optical fibers 17.

Similarly, light of wavelengths $\lambda_1, \lambda_2, \ldots, \lambda_n$ returning via the optical fibers 17 to the narrowband ports 22 is transmitted and reflected by the interference filters 20 and reflectors 21, and is thereby combined into a broadband light signal which is output through the broadband port 18 to the optical fiber 8.

The wavelength multiplexer-demultiplexer 9 in FIG. 2 is preferably manufactured as single assembly, which can be mounted and handled as a single unit.

If the broadband light source 2 provides broadband light with a bandwidth of 35nm and the wavelength multiplexer-demultiplexer 9 demultiplexes this to twelve narrow bands (n=12), that allows a spectral bandwidth of substantially 3 nm per band. If the bandwidth of the broadband signal is 60 nm, that allows substantially 5 nm per narrow band. If the bandwidth of the broadband signal is 80 nm, that again allows 5 nm per narrow band, with room for guard bands between the 5-nm narrow bands. The interference filters 20 should have passbands of corresponding spectral width.

Figure 3:
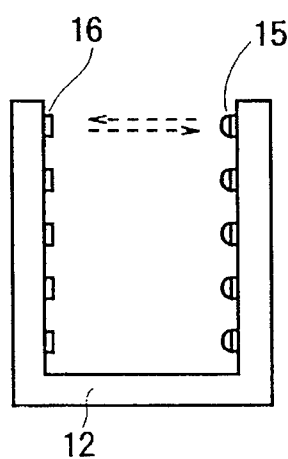
FIG. 3 illustrates the support in FIG. 1.

Referring to FIG. 3, the support 12 is, for example, a rigid U-shaped frame firmly supporting the collimators 15 and reflectors 16. The optic axes of the collimators 15 and reflectors 16 are mutually aligned so that light emitted from a collimator 15 will be reflected by the corresponding reflector 16 and return to the same collimator 15, as indicated by the arrows in the drawing.

Figure 4:
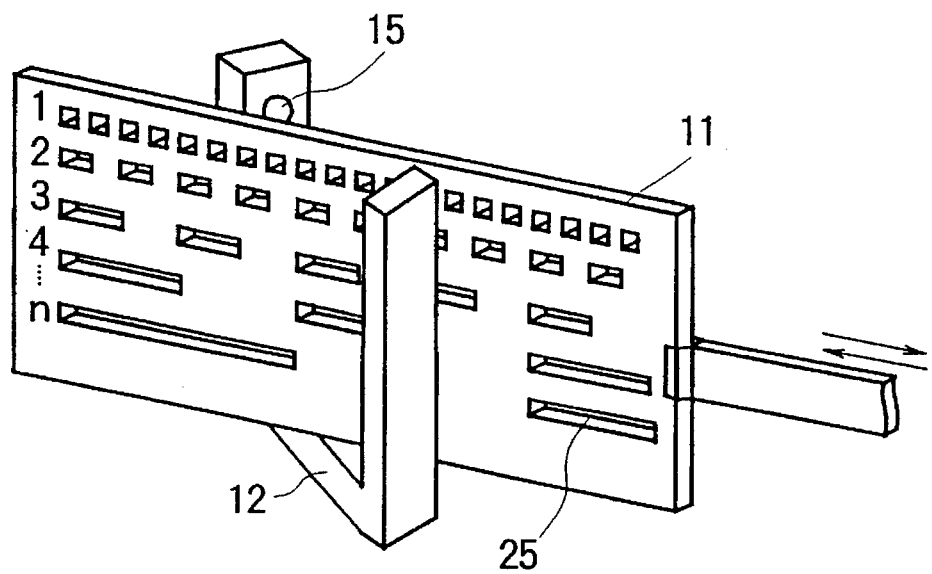
FIG. 4 is a perspective view of the support and slotted code plate in FIG. 1.

FIG. 4 shows a perspective view of the novel optical position encoder 10 with its support 12 and code plate 11. The code plate 11 is interposed between the collimators 15 and reflectors 16 in the support 12, at a non-perpendicular angle to their optic axes. The code plate 11 has a plurality of slots 25 disposed in parallel tracks (labeled 1, 2 ..., n in the drawing). The slots 25 in each track permit the passage of light between a corresponding collimator 15 and reflector 16. As the code plate 11 moves back and forth as indicated by the arrows, light is alternately passed by these slots 25 and blocked by the intervening parts of the code plate 11.

Figure 5:
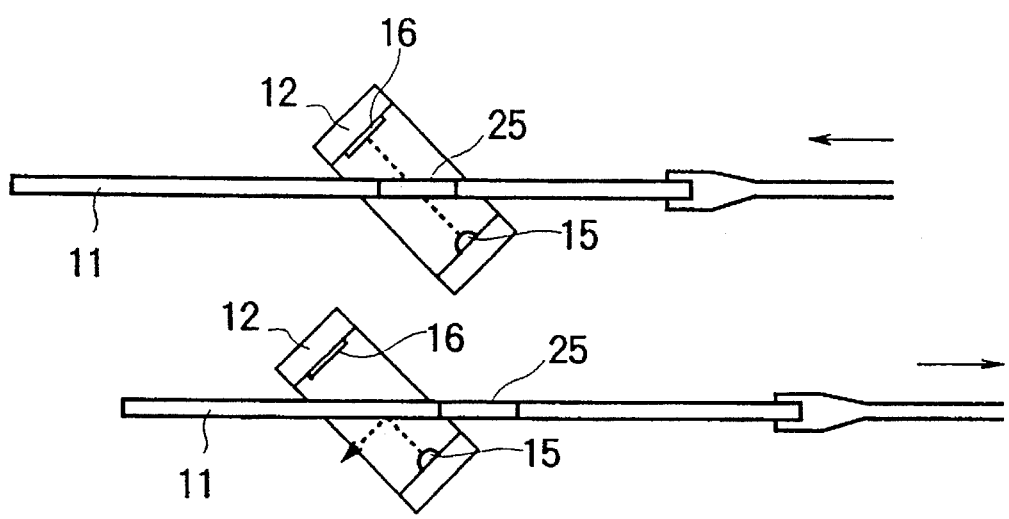
FIG. 5 is a top view of the support and code plate.

FIG. 5 shows a top view of the code plate 11 moving between a collimator 15 and reflector 16 in the support 12. When a slot 25 in the code plate 11 is aligned with the collimator 15 and reflector 16, as at the top in FIG. 5, light can pass from the collimator 15 to the reflector 16 and back to the collimator 15. When the code plate 11 has moved as at the bottom in FIG. 5 and the slot 25 is no longer aligned, the light is blocked by the code plate 11. Since the code plate 11 is disposed at a non-perpendicular angle, the blocked light is reflected off to the side and does not return to the collimator 15.

Referring again to FIG. 4, it can be seen that the slots 25 are arranged in a binary code pattern. The invention can be practiced with other digital codes, however, such as the well-known binary-coded decimal (BCD) code, or a Gray code. For reference, Table 1 lists binary, BCD, and Gray codes for the values from zero to sixteen in the decimal number system. In this table a one corresponds to a slot, and a zero to the absence of a slot.

TABLE 1

Typical Code Patterns

| Decimal | Binary | BCD | Gray |
| --- | --- | --- | --- |
| 0 | 00000 | 0 0000 | 00000 |
| 1 | 00001 | 0 0001 | 00001 |
| 2 | 00010 | 0 0010 | 00011 |
| 3 | 00011 | 0 0011 | 00010 |
| 4 | 00100 | 0 0100 | 00110 |
| 5 | 00101 | 0 0101 | 00111 |
| 6 | 00110 | 0 0110 | 00101 |
| 7 | 00111 | 0 0111 | 00100 |
| 8 | 01000 | 0 1000 | 01100 |
| 9 | 01001 | 0 1001 | 01101 |
| 10 | 01010 | 1 0000 | 01111 |
| 11 | 01011 | 1 0001 | 01110 |
| 12 | 01100 | 1 0010 | 01010 |
| 13 | 01101 | 1 0011 | 01011 |
| 14 | 01110 | 1 0100 | 01001 |
| 15 | 01111 | 1 0101 | 01000 |
| 16 | 10000 | 1 0110 | 11000 |

The operation of this first embodiment will now be described with reference to FIGS. 1, 6 and 7.

Figure 6:
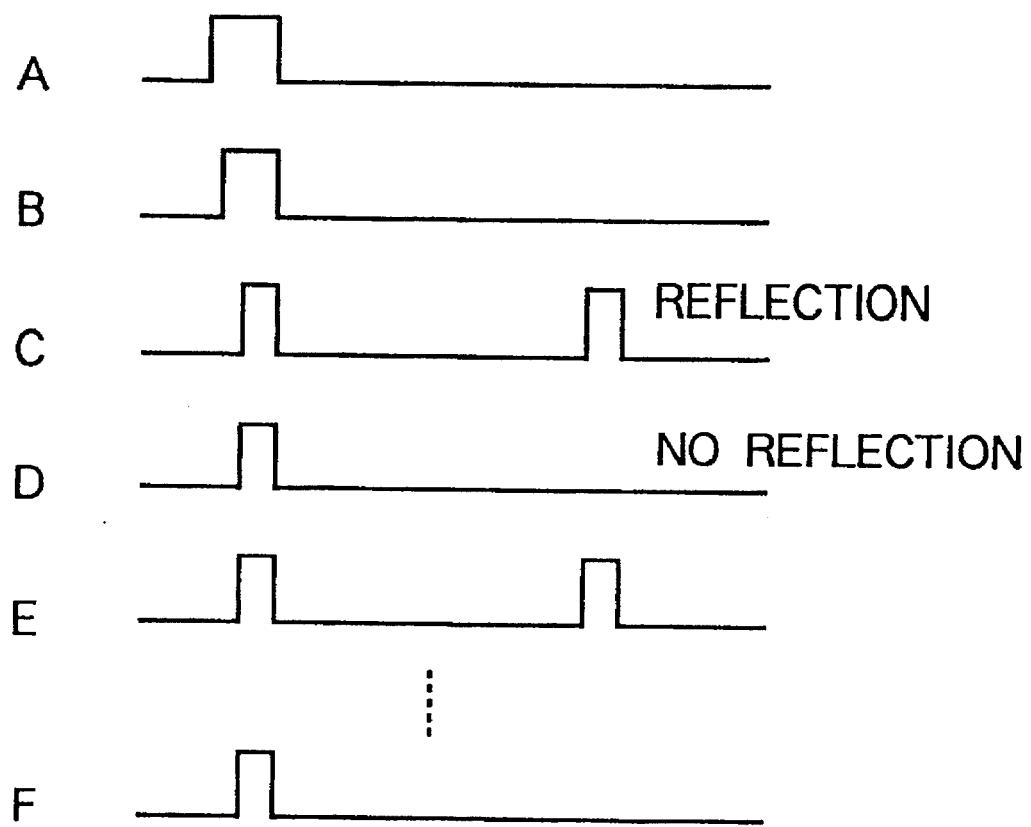
FIG. 6 illustrates the timing of various signals in the first embodiment.

Referring to FIG. 6, when the control unit 1 delivers an electrical pulse A to the broadband light source 2, the broadband light source 2 responds by producing a broadband light pulse B. This is transmitted through the lens system 3, optical coupler 4, and optical fiber 8 to the wavelength multiplexer-demultiplexer 9, where it is demultiplexed to narrowband light; pulses C, D, E, ..., F, having wavelengths $\lambda_1, \lambda_2, \lambda_3, \ldots, \lambda_n$.

These narrowband light pulses C, D, E, ... F are transmitted through the optical fibers 17 to respective collimators 15, and emitted from the collimators 15 toward respective reflectors 16. The narrowband light pulses that pass through slots 25 and are not blocked by the code plate 11 (pulses C and E in FIG. 6) are reflected by the reflectors 16 back to the collimators 15. From the collimators 15 they return to the wavelength multiplexer-demultiplexer 9, where they are multiplexed into a returning broadband light pulse, which is transmitted through the optical fiber 8 to the optical coupler 4. Exiting at the third port (c) of the optical coupler 4, this returning broadband light pulse is demultiplexed by the wavelength demultiplexer 5 into a plurality of returning narrowband light pulses of different wavelengths, which are converted to electrical signals by the photosensors 6. By receiving these electrical signals, the control unit 1 can identify the position of the code plate 11.

Figure 7:
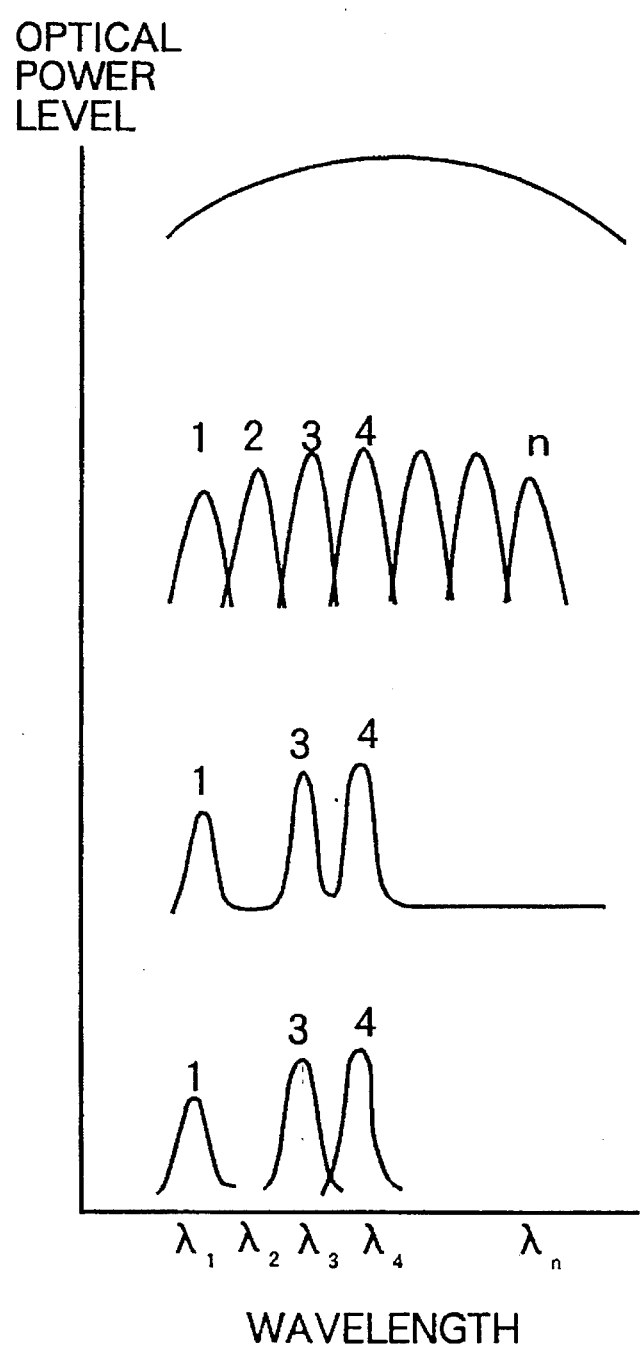
FIG. 7 illustrates the spectra of various signals in the first embodiment.

FIG. 7 shows the spectra of various signals in the invented system. Wavelength is indicated on the horizontal axis and optical power schematically on the vertical axis. (The indicated spectra are not necessarily drawn to scale on the vertical axis.) Shown at the top of FIG. 7 is the broadband spectrum emitted by the broadband light source 2, spanning wavelengths from $\lambda_1$ to $\lambda_n$. Shown below this are the narrowband spectra of the pulses input and output at the narrowband ports 22 of the wavelength multiplexer-demultiplexer 9, numbered 1, 2, ..., n. The spectrum of the returning broadband light pulse, shown next in FIG. 7, will have peaks at the wavelengths of those narrowband pulses which pass through slots 25 in the code plate 11 ($\lambda_1, \lambda_3$, and $\lambda_4$ in the drawing). When demultiplexed by the wavelength demultiplexer 5, this broadband pulse yields separate returning narrowband pulses centered at these wavelengths, as shown at the bottom of FIG. 7.

In a typical factory or aircraft, the front end 13 of the sensor system may be disposed at some distance from the back end 7. There is accordingly considerable advantage to be gained in coupling the two by a single optical fiber 8 as in the present invention. The wavelength-division multiplexing system employed in the present invention has the further advantage of transmitting n bits of position information simultaneously over the single fiber 8, thereby speeding up the position measurement process.

Another advantage of the invention is that, even if the orientation of the code plate 11 is disrupted by vibration or mechanical shock, since the collimators 15 and reflectors 16 are mounted in the rigid support 12, the optical paths between them will remain unaffected. That is, the invention provides immunity from mechanical shock and vibration as well as from electromagnetic interference.

Still another advantage of the invention is that, unlike a conventional reflective code plate, the code plate 11 with slots 25 is not harmed by discoloration or other aging changes. It makes no difference how well the surface of the code plate 11 reflects light, because the reflected light is not used. Instead, for a given track, a single reflector 16 located behind the code plate 11 provides a uniform reflectivity.

Figure 8:
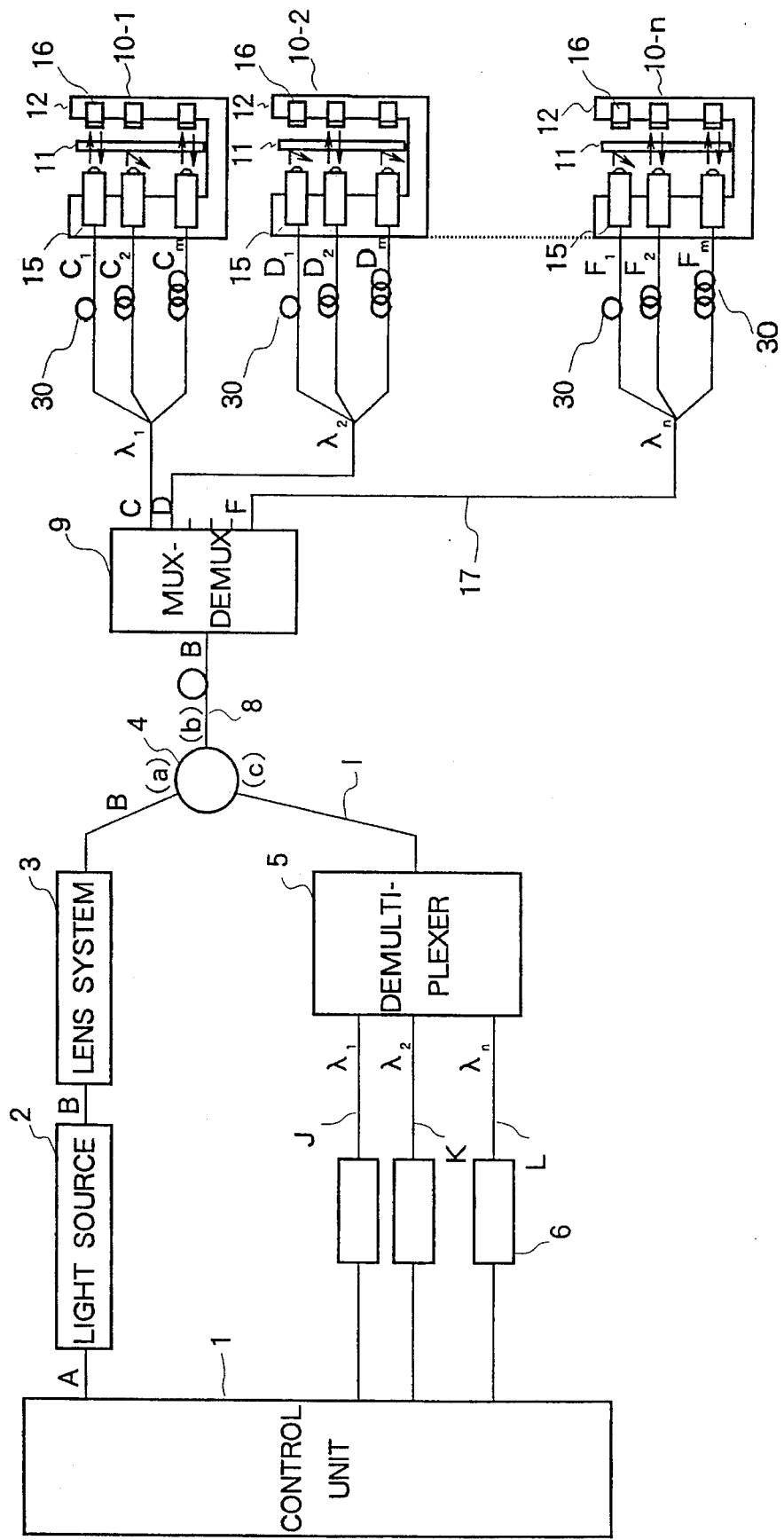
FIG. 8 is a block diagram of a second embodiment of the invention.

FIG. 8 is a block diagram illustrating a second embodiment of the invention, showing a system with n different m-bit encoders, for sensing the position of n different objects. Elements identical to elements in FIG. 1 are denoted by the same reference numerals, and detailed descriptions will be omitted.

The system in FIG. 8 has m-bit optical position encoders 10-1, 10-2 ..., 10-n. Each of these is of the type illustrated in FIGS. 3 to 5, comprising a code plate 11, support 12, collimators 15, and reflectors 16. Slots 25 are now arranged in m tracks in each code plate 11.

The back end 7, optical fiber 8, and wavelength multiplexer-demultiplexer 9 in FIG. 8 have the same configuration as in FIG. 1, and operate in the same way. The difference between the two embodiments lies in the manner in which the wavelength multiplexer-demultiplexer 9 is coupled to the optical position encoders.

In FIG. 8, each narrowband port of the wavelength multiplexer-demultiplexer 9 is coupled by an optical fiber 17 to a plurality of optical delay lines 30 having different propagation delays. In the drawing, the optical delay lines 30 are shown as coiled optical fibers of different lengths. Spool-wound fiber coils can be used, for example.

Transmission of the narrowband light pulse emitted from one narrowband port of the wavelength multiplexer-demultiplexer 9 (light pulse C for example) through this plurality of optical delay lines 30 creates a plurality of delayed narrowband light pulses ($C_1, C_2, \ldots, C_m$), which are input to the collimators 15 in the corresponding optical position encoder (e.g. encoder 10-1). Those narrowband light pulses that are reflected by the reflectors 16 and return to the wavelength multiplexer-demultiplexer 9 are again delayed by the optical delay lines 30 on their return trip, so that they become further separated on the time axis. After this second passage through the optical delay lines 30, all the narrowband light pulses from a single optical position encoder are recombined into a single narrowband pulse train that is input to one narrowband port of the wavelength multiplexer-demultiplexer 9.

The operation of this second embodiment will be further described with reference to FIG. 9, which shows the timing and wavelength spectra of various signals.

When the control unit 1 delivers an electrical pulse A to the broadband light source 2, the broadband light source 2 emits a broadband light pulse B with the same timing and spectrum as in the first embodiment. The wavelength multiplexer-demultiplexer 9 demultiplexes this pulse to narrowband light pulses C, D, . . . , F, all of which are concurrent in time.

The optical delay lines 30 split each of these narrowband light pulses into a plurality of delayed narrowband light pulses with different delays $t_1, t_2, \ldots, t_m$. Thus narrowband light pulse C produces delayed narrowband light pulses $C_1$, $C_2, \ldots, C_m$, all with the same wavelength $\lambda_1$ but different timings. These pulses are emitted from the collimators 15 in optical position encoder 10-1. Similarly, narrowband light pulse F produces delayed narrowband light pulses $F_1, F_2, \ldots, F_m$, all having wavelength $\lambda_n$ and different timings, which are emitted from the collimators 15 in optical position encoder 10-n.

Figure 9:
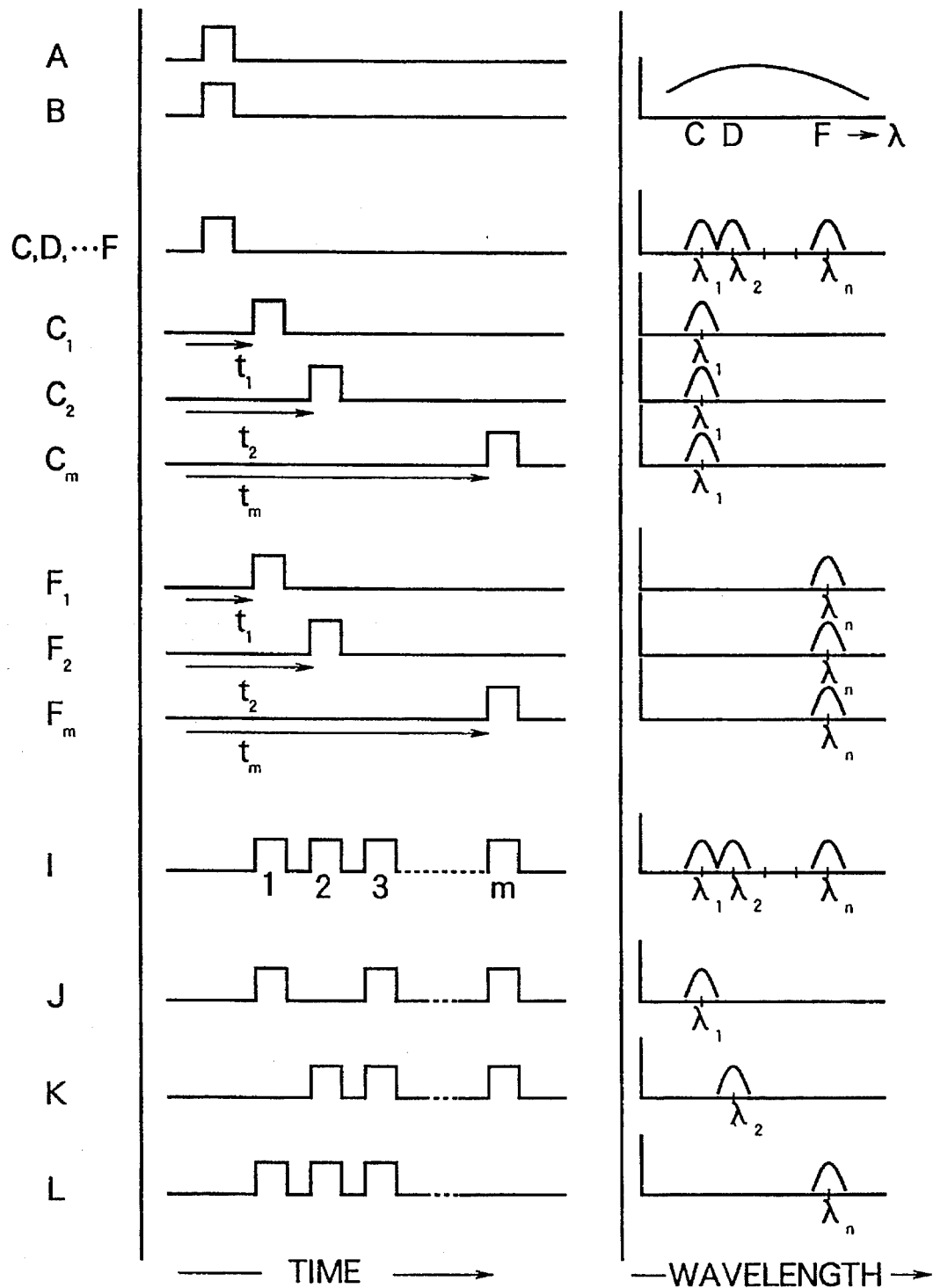
FIG. 9 illustrates the timing and spectra of various signals in the second embodiment.

The reflections of those delayed narrowband light pulses that pass through slots 25 in the code plate 11 in each optical position encoder are received again by their respective collimators 15, transmitted back through the optical delay lines 30, and recombined into a narrowband pulse train (not illustrated in FIG. 9). The wavelength multiplexer-demultiplexer 9 accordingly receives one narrowband pulse train from each optical position encoder, each narrowband pulse train having a different wavelength. The wavelength multiplexer-demultiplexer 9 multiplexes this plurality of narrowband pulse trains into a single returning broadband pulse train I, shown in FIG. 9 as consisting of broadband pulses 1, 2, . . . , m.

This returning broadband pulse train is transmitted through the optical fiber 8 and optical coupler 4 to the wavelength demultiplexer 5, where it is demultiplexed to a plurality of returning narrowband pulse trains J, K, . . . , L of different wavelengths $\lambda_1, \lambda_2, \ldots, \lambda_n$. These returning narrowband pulse trains are substantially identical to the narrowband pulse trains that were received at the narrowband ports of the wavelength multiplexer-demultiplexer 9. The photosensors 6 convert them to electrical signals from which the control unit 1 identifies the position of each code plate 11 in FIG. 8.

This novel use of wavelength-division multiplexing to distribute pulses to different optical position encoders and time-division multiplexing to distribute pulses to the individual collimators in each position encoder has several advantages. One is that a plurality of position encoders can be served by a single broadband light source 2 and a single optical fiber 8. Another is that all the position encoders can be driven at once, enabling the positions of multiple code plates 11 to be detected simultaneously. Still another advantage is that only a single photosensor 6 is needed for each optical position encoder, instead of one photosensor per track in each position encoder.

Figure 10:
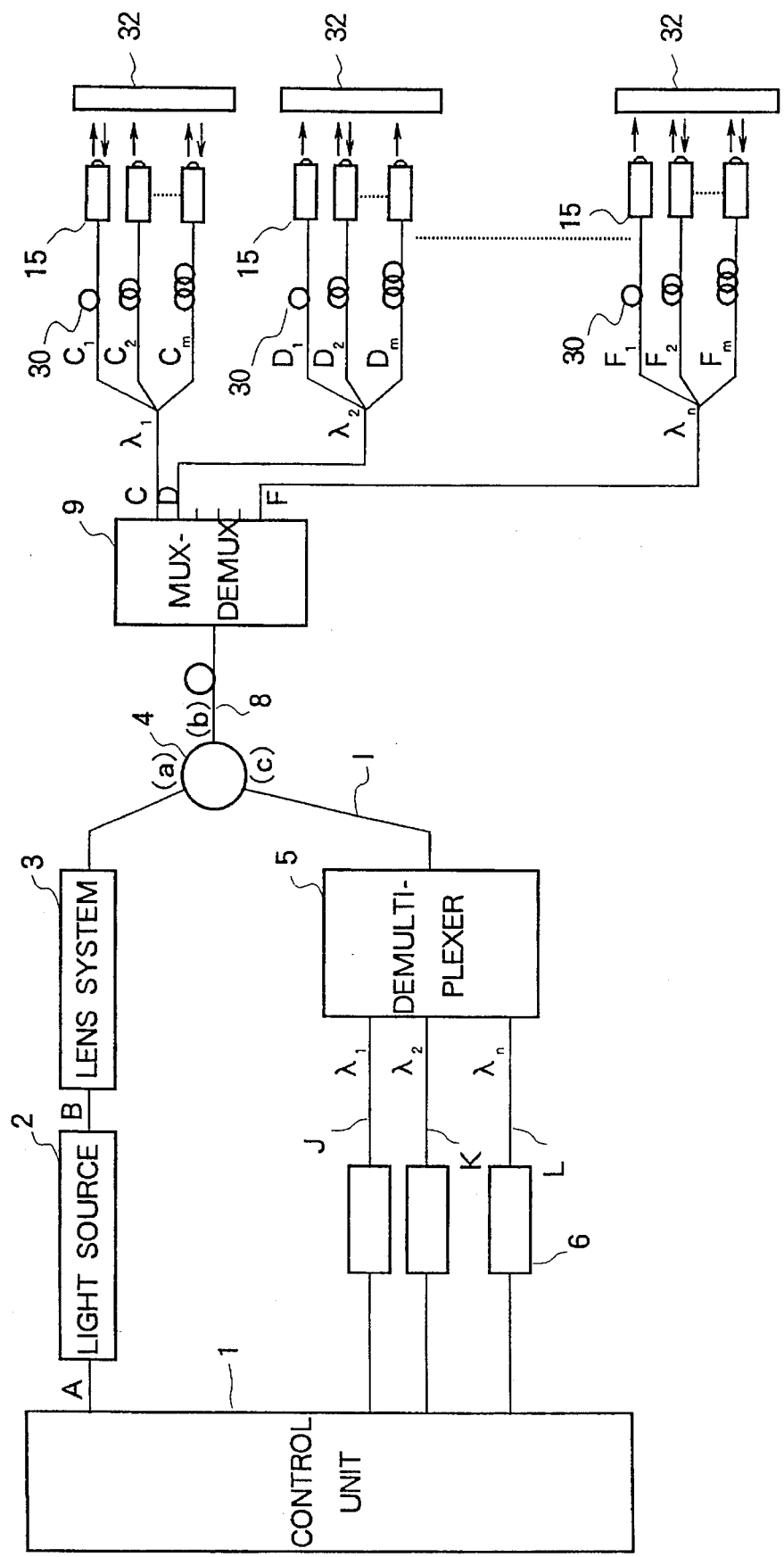
FIG. 10 illustrates a variation of the second embodiment.

This same novel multiplexing scheme can also be employed in systems with other types of optical position encoders. One such system is shown in FIG. 10 as a variation of the second embodiment. Elements common to both FIGS. 8 and 10 are identified by the same reference numerals, and descriptions will be omitted.

In FIG. 10, the optical position encoders have reflective code plates 32 of the conventional type that reflect light back to the collimators 15. Accordingly, there are no reflectors disposed behind the reflective code plates 32.

Figure 11:
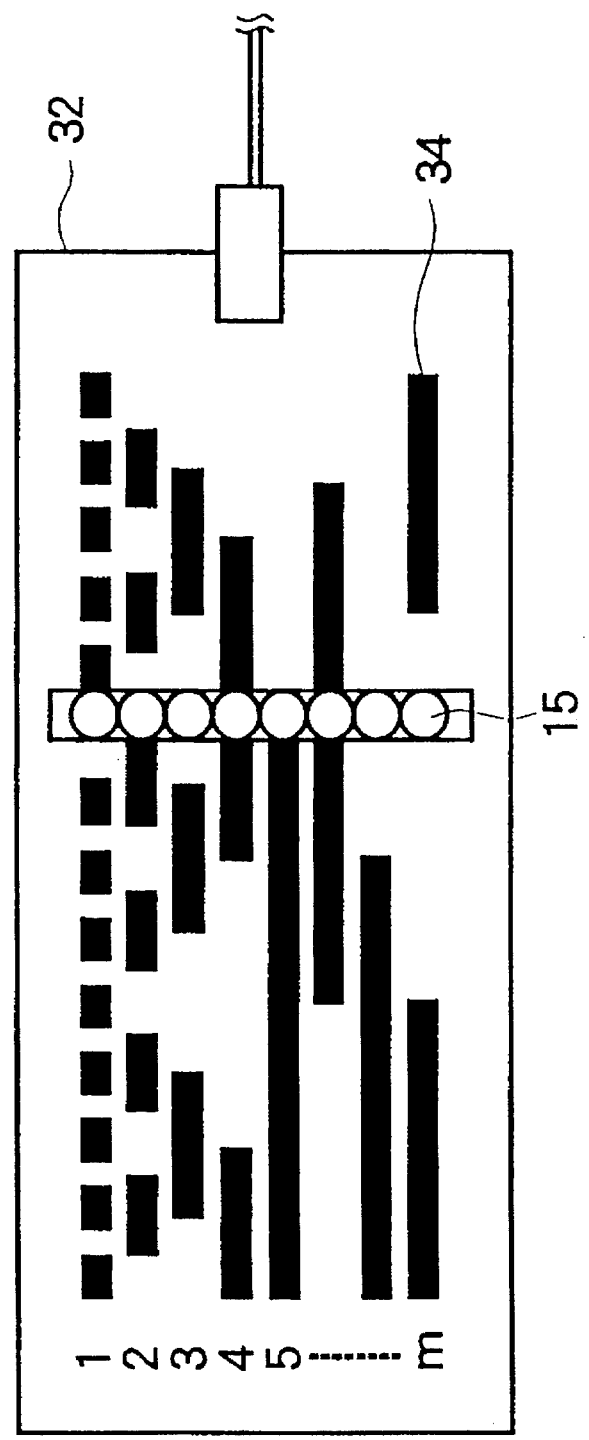
FIG. 11 illustrates the reflective code plate in FIG. 10.

Referring to FIG. 11, each reflective code plate 32 has a reflective white surface with a pattern of black stripes 34 disposed in a plurality of tracks (numbered 1 to m in the drawing). The spaces between the black stripes 34 reflect light back to the collimators 15, while the black stripes 34 absorb light.

Except for this difference, the system in FIG. 10 is identical to the one in FIG. 8 and operates in the same way.

As another variation, although the wavelength multiplexer-demultiplexer 9 illustrated in FIG. 2 employed interference filters, the invention can be practiced with other types of wavelength multiplexer-demultiplexers.

Figure 12:
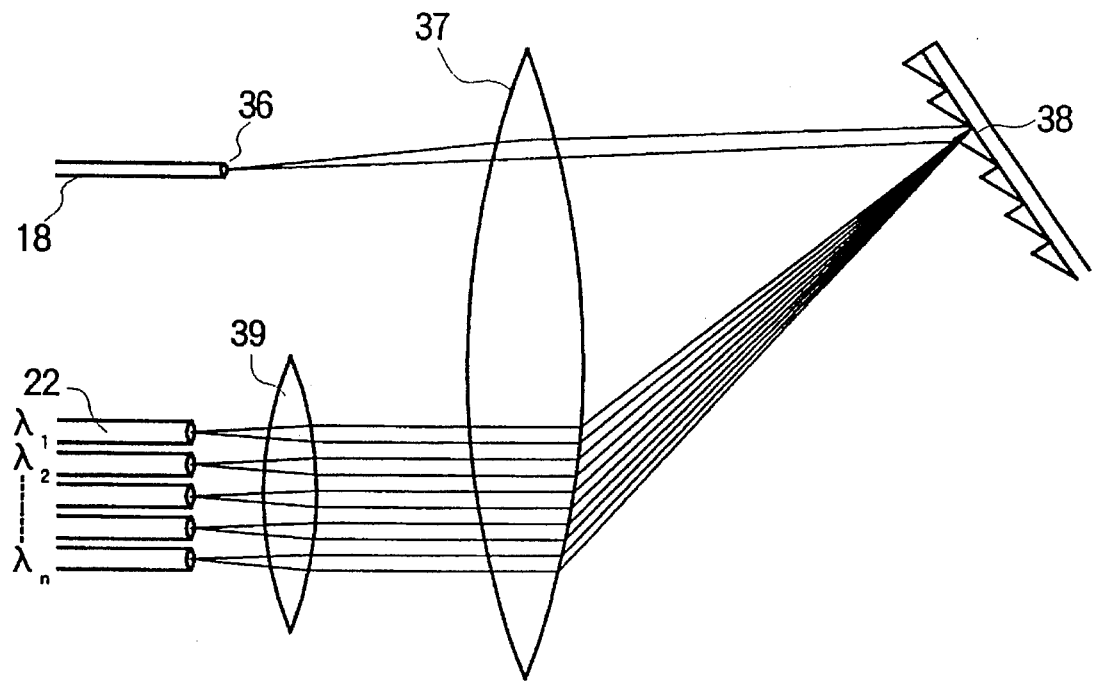
FIG. 12 shows the structure of an alternate version of the wavelength multiplexer-demultiplexer in FIGS. 1 and 8.

FIG. 12 shows the general configuration of a wavelength multiplexer-demultiplexer employing a grating. Like the wavelength multiplexer-demultiplexer 9 in FIG. 2, this wavelength multiplexer-demultiplexer has a broadband port 18 and a plurality of narrowband ports 22. Light entering at the broadband port 18 is directed by a microlens 36 toward a first lens 37, which collimates the light into a parallel beam. This parallel beam is directed onto a grating 38, causing different wavelengths to be reflected at different angles. The reflected light is again collimated by the first lens 37, then focused by a second lens 39 to the narrowband ports 22, which output light of wavelengths $\lambda_1, \lambda_2, \ldots, \lambda_n$.

Light of these wavelengths returning to the narrowband port 22 travels the same path in reverse and emerges as a single broadband light signal at the broadband port 18.

Figure 13:
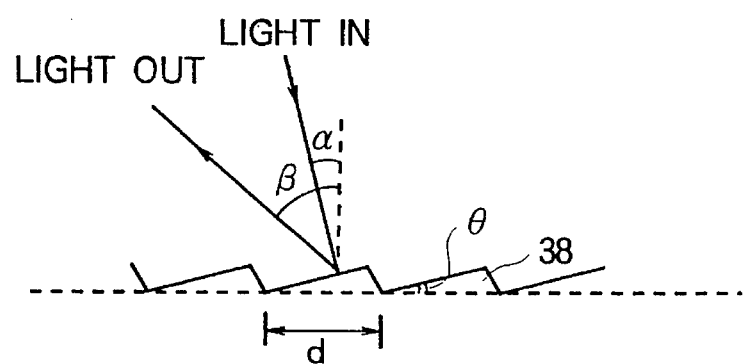
FIG. 13 illustrates parameters of the grating in FIG. 12.

The principle of wavelength separation by reflection from a grating is well known; the relevant parameters are shown in FIG. 13. The angles of incidence $\alpha$ and reflection $\beta$, the wavelength $\lambda$, and the grating constant (groove spacing) d satisfy the relation $$\sin \alpha + \sin \beta = k\, \lambda/d \quad k=0, \pm 1, \pm 2, \ldots$$

where k is zero or a positive or negative integer. This relation is independent of the so-called blaze angle $\theta$ shown in FIG. 13.

The above embodiments have shown linear position encoders with rectangular code plates, but the invention can also be practiced with rotary position encoders having circular code plates (i.e. disks), or with a mixture of linear and rotary position encoders. The term "code plate" in the appended claims should be understood as referring to both types.

Those skilled in the art will recognize that further variations of the above embodiments are possible without departing from the scope of the invention claimed below.

What is claimed is:

1. A position-sensing method, comprising the steps of:

mounting, in a support, a plurality of collimators and a like plurality of reflectors, having optic axes aligned so that light emitted from each collimator will be reflected by a corresponding reflector and return to the same collimator;

interposing between said collimators and said reflectors, in a plane aligned at a non-perpendicular angle to said optic axes, a movable code plate having slots for passage of light between said collimators and said reflectors, said slots being disposed so that, as said code plate moves, light emitted from each said collimator is alternately passed and blocked;

generating a broadband light pulse;

transmitting said broadband light pulse through an optical fiber;

demultiplexing said broadband light pulse into a plurality of narrowband light pulses of different wavelengths;

transmitting said narrowband light pulses to said collimators for emission toward respective reflectors;

receiving, at said collimators, those narrowband light pulses that are reflected by said reflectors and not blocked by said code plate;

multiplexing the narrowband light pulses thus received into a returning broadband light pulse;

transmitting said returning broadband light pulse through said optical fiber;

demultiplexing said returning broadband light pulse into a plurality of returning narrowband light pulses of different wavelengths; and converting said returning narrowband light pulses to electrical signals.

2. The method of claim 1, wherein said broadband light pulse is generated by an optical fiber amplifier.

3. The method of claim 1, wherein said broadband light pulse is generated by a semiconductor laser diode.

4. The method of claim 1, wherein the step of demultiplexing said broadband light pulse comprises transmitting said broadband light pulse through an interference filter.

5. The method of claim 1, wherein the step of demultiplexing said broadband light pulse comprises reflecting said broadband light pulse from a grating.

6. An optical position sensing system, comprising:

a support having a plurality of collimators and a like plurality of reflectors, the optic axes of corresponding collimators and reflectors being mutually aligned;

a movable code plate disposed between said collimators and said reflectors in a plane aligned at a non-perpendicular angle to said optic axes, having slots for passage of light from said collimators to said reflectors and back to said collimators, said slots being disposed so that, as said code plate moves, light emitted from each said collimator is alternately passed and blocked;

a broadband light source for emitting a broadband light pulse;

an optical fiber for transmitting said broadband light pulse and a returning broadband light pulse;

a wavelength demultiplexer for demultiplexing said returning broadband pulse into a plurality of returning narrowband light pulses of different wavelengths;

a plurality of photosensors coupled to convert said returning narrowband light pulses to electrical signals;

an optical coupler having a first port optically coupled to said broadband light source, a second port optically coupled to said optical fiber, and a third port optically coupled to said wavelength demultiplexer, for transmitting said broadband light pulse from said first port to said second port, and transmitting said returning broadband light pulse from said second port to said third port; and a wavelength multiplexer-demultiplexer having a broadband port optically coupled to said optical fiber and a plurality of narrowband ports optically coupled to respective collimators in said support, for receiving said broadband light pulse from said optical fiber, demultiplexing said broadband light pulse into a plurality of narrowband light pulses of different wavelengths, transmitting said narrowband light pulses from said narrowband ports to said collimators, receiving from said collimators returning narrowband light pulses that have been reflected by said reflectors and not blocked by said code plate, multiplexing said returning narrowband light pulses into said returning broadband light pulse, and transmitting said returning broadband light pulse into said optical fiber.

7. The system of claim 6, wherein said broadband light source is an optical fiber amplifier.

8. The system of claim 6, wherein said broadband light source is a semiconductor laser diode.

9. The system of claim 6, wherein said wavelength multiplexer-demultiplexer comprises at least one interference filter.

10. The system of claim 6, wherein said wavelength multiplexer-demultiplexer comprises a grating.

11. A method of sensing positions of multiple objects, comprising the steps of:

generating a broadband light pulse;

transmitting said broadband light pulse through an optical fiber;

demultiplexing said broadband light pulse into a plurality of narrowband light pulses of different wavelengths;

transmitting each of said narrowband light pulses through a plurality of optical delay lines having different propagation delay times, thereby creating a plurality of delayed narrowband light pulses;

transmitting the delayed narrowband light pulses created from each narrowband light pulse to a corresponding optical position encoder having a movable code plate and a plurality of collimators;

in each optical position encoder, emitting said delayed narrowband light pulses from respective collimators toward said code plate;

in each optical position encoder, receiving reflections of said delayed narrowband light pulses, said reflections being received depending on whether said delayed narrowband light pulses are reflected or not by said code plate;

combining the reflections thus received in each optical position encoder into a corresponding narrowband pulse train, thereby creating a plurality of narrowband pulse trains of different wavelengths, consisting of one narrowband pulse train for each optical position encoder;

multiplexing said plurality of narrowband pulse trains into a single returning broadband pulse train;

transmitting said returning broadband pulse train through said optical fiber;

demultiplexing said returning broadband pulse train into a plurality of returning narrowband pulse trains of said different wavelengths; and converting said returning narrowband pulse trains to electrical signals.

12. The method of claim 11, wherein:

at least one said optical position encoder comprises a support holding said plurality of collimators and having a like plurality of reflectors, the optic axes of corresponding collimators and reflectors being mutually aligned;

the movable code plate in this optical position encoder is disposed between said collimators and said reflectors in a plane aligned at a non-perpendicular angle to their optic axes; and said code plate has slots for passage of light from said collimators to said reflectors and back to said collimators, said slots being disposed so that, as said code plate moves, light emitted from each said collimator is alternately passed through said slots to a corresponding one of said reflectors and back to said collimator, and reflected by said code plate away from said collimator.

13. The method of claim 11, wherein said broadband light pulse is generated by use of an optical fiber amplifier.

14. The method of claim 11, wherein said broadband light pulse is generated by use of a semiconductor laser diode.

15. The method of claim 11, wherein the step of demultiplexing said broadband light pulse comprises transmitting said broadband light pulse through an interference filter.

16. The method of claim 11, wherein the step of demultiplexing said broadband light pulse comprises reflecting said broadband light pulse from a grating.

17. An optical position sensing system for sensing positions of multiple objects, comprising:

a broadband light source for emitting a broadband light pulse;

an optical fiber for transmitting said broadband light pulse and a returning broadband pulse train;

a wavelength demultiplexer for demultiplexing said returning broadband pulse train into a plurality of returning narrowband pulse trains of different wavelengths;

a plurality of photosensors coupled to convert said returning narrowband pulse trains to electrical signals;

an optical coupler having a first port optically coupled to said broadband light source, a second port optically coupled to said optical fiber, and a third port optically coupled to said wavelength demultiplexer, for transmitting said broadband light pulse from said first port to said second port, and transmitting said returning broadband pulse train from said second port to said third port;

a wavelength multiplexer-demultiplexer having a broadband port optically coupled to said optical fiber and a plurality of narrowband ports, for receiving said broadband light pulse from said optical fiber, demultiplexing said broadband light pulse into a plurality of narrowband light pulses of different wavelengths, transmitting said narrowband pulses from respective narrowband ports, receiving returning narrowband pulse trains at said narrowband ports, multiplexing said returning narrowband pulse trains to create said returning broadband pulse train, and transmitting said returning broadband pulse train into said optical fiber;

for each narrowband port of said wavelength multiplexer-demultiplexer, a plurality of optical delay lines coupled thereto and having different propagation delay times; and for each narrowband port of said wavelength multiplexer-demultiplexer, a corresponding optical position encoder having a movable code plate and a plurality of collimators coupled to respective optical delay lines, for emitting narrowband light pulses transmitted from said narrowband port and delayed by different amounts by said optical delay lines, receiving reflections thereof depending on whether said narrowband light pulses are reflected or not by said code plate, and transmitting said reflections into said optical delay lines, so that said reflections are combined into a returning narrowband pulse train for input at said narrowband port of said wavelength multiplexer-demultiplexer.

18. The system of claim 17, wherein:

at least one said optical position encoder comprises a support holding said plurality of collimators and having a like plurality of reflectors, the optic axes of corresponding collimators and reflectors being mutually aligned;

the movable code plate in this optical position encoder is disposed between said collimators and said reflectors in a plane aligned at a non-perpendicular angle to their optic axes; and said code plate has slots for passage of light from said collimators to said reflectors and back to said collimators, said slots being disposed so that, as said code plate moves, light emitted from each said collimator is alternately passed through said slots to a corresponding one of said reflectors and back to said collimator, and reflected by said code plate away from said collimator.

19. The system of claim 17, wherein said broadband light source is an optical fiber amplifier.

20. The system of claim 17, wherein said broadband light source is a semiconductor laser diode.

21. The system of claim 17, wherein said wavelength multiplexer-demultiplexer comprises at least one interference filter.

22. The system of claim 17, wherein said wavelength multiplexer-demultiplexer comprises a grating.

* * * * *